United States Patent Office 3,121,227
Patented Feb. 11, 1964

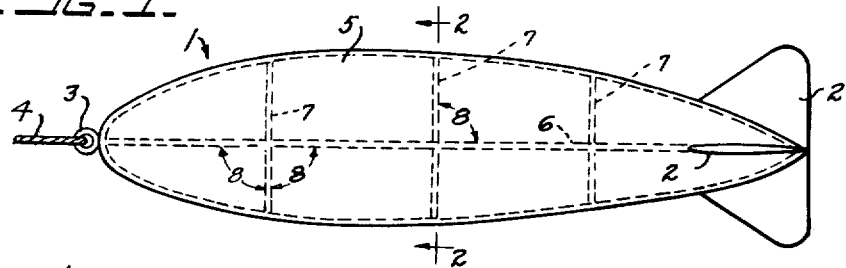
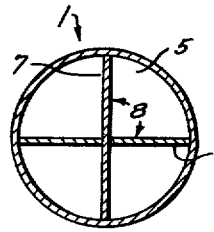
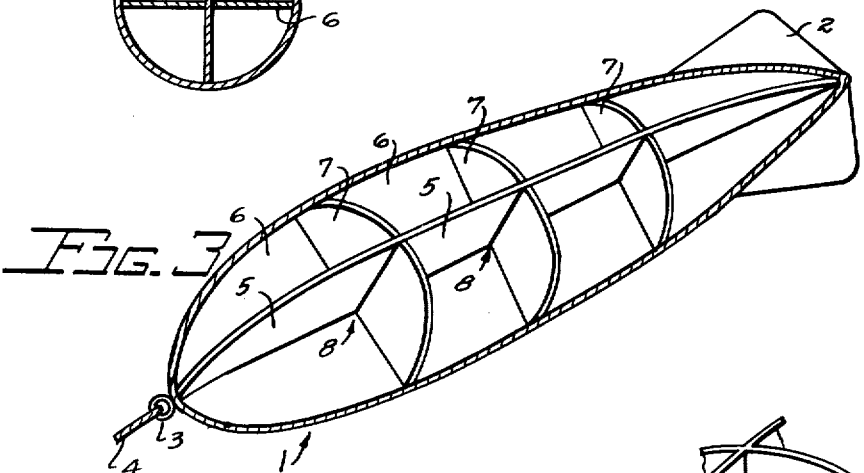
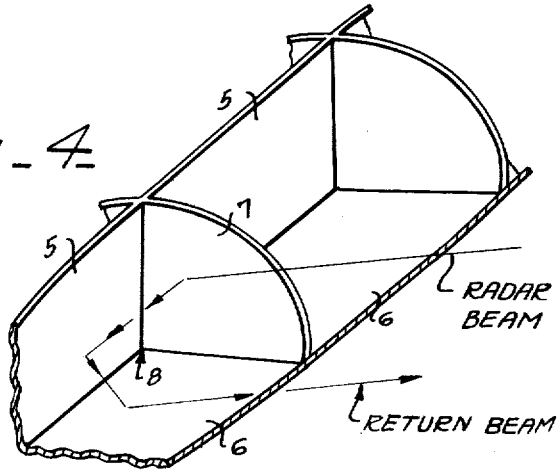

3,121,227
FRANGIBLE TOW TARGET
Dwaine R. Franklin, Yuma, Ariz., assignor to the United States of America as represented by the Secretary of the Air Force
Filed Jan. 16, 1956, Ser. No. 559,496
4 Claims. (Cl. 343—18)
(Granted under Title 35, U.S. Code (1952), sec. 266)

The invention described herein may be manufactured and used by or for the Government for governmental purposes without the payment to me of any royalty thereon.

This invention relates to a lightweight, streamlined tow target offering low drag resistance so as to be capable of being towed at high speeds by jet aircraft.

In the past, great difficulty has been experienced in developing a practical tow target for use in jet propelled fighter target practice, particularly for radar operations. Metallic targets were utilized since it was necessary to use a material which would reflect the radar beam. However, such targets were relatively heavy, requiring the use of a steel cable and heavier type aircraft in towing. The metallic type also entailed danger of damage from collision of attacking aircraft either with the steel cable or target itself. Also, the radar reflecting banner type target has been utilized, usually constructed of cloth interwoven with copper wire. This type also had several disadvantages: Due to high air resistance, steel cables and heavier bomber type aircraft were again necessary; due to the weight of the cable it was difficult to extend the towline a very appreciable distance behind the towing plane; high air resistance prevented very high speed operations, and caused considerable bucking and deflection of the target; the cable towline and wire-cloth construction of the target also afforded similar dangers of damage to attacking aircraft in the event of collision with the tow target.

It is thus an object of this invention to provide a tow target of frangible material to prevent damage in event of collision.

It is another object to construct the target of lightweight material in a stream line form requiring the use merely of a light tow line, such as nylon, to negate any possibility of damage, and to permit towing by lighter aircraft, and to allow the extension of the target at greater distances from the towing aircraft.

It is also an object to design a streamlined tow target to reduce air resistance and thus increase the speed of towing.

It is a further and principal object of the invention to enclose the radar reflecting surfaces, not only to protect them from deflection, but to reduce their drag resistance.

Another object is the provision of a light stream line frangible tow target for high speed towing on which a plurality of frangible radar corner reflectors are mounted internally thereof.

A further object includes the provision of a stream line frangible tow target having a plurality of frangible reinforcing partitions or bulkheads and panels therein coated to provide a plurality of radar corner reflectors disposed within the outer shell of the tow target.

The above and other objects and advantages of the invention will be better understood by referring to the following detailed description of a preferred embodiment of the invention, taken in connection with the accompanying drawings, in which:

FIG. 1 is a plain view of the improved tow target.

FIG. 2 is a cross sectional view taken about on the lines 2—2 of FIG. 1.

FIG. 3 is a perspective view of the tow target; part of the shell being broken away to show the partition member and corner reflectors.

FIG. 4 is an enlarged fragmentary view of a segment of the tow target showing the radar beam reflecting surfaces on the partitions or bulkheads illustrating the course of reflection of a radar beam.

Referring more particularly to the drawings, the preferred form of tow target comprises a thin streamline shell or body 1 of a frangible composition and permeable to radar beams, such as light molded plywood, a frangible wood frame covered by a doped fabric, reinforced paper material, or a molded plastic. Aerodynamic stabilizers 2 are attached to the rearward end of the body, and a towing hook or eye 3 is attached to the forward end for connection of the target to the towline 4.

Supported within and attached at their outer edges to the shell 1 is the foundation for the reflecting radar beam surfaces comprising a vertical wall 5, the horizontal webs 6 perpendicular to the vertical wall 5, and a plurality of bulkheads 7 arranged at spaced intervals and perpendicular to the planes of members 5 and 6 to form a series of mutually perpendicular intersecting planes.

The members 5, 6 and 7 are composed of a frangible material, and are completely covered by a material highly reflective to radar beams, preferably aluminum foil. The entire structure will thus be frangible in order to prevent damage to colliding aircraft; however, the structure will be sufficiently durable to act partially to reinforce the thin shell structure, although the shell structure is designed to be self-supporting.

Each corner formed by the intersection of the three mutually perpendicular planes is commonly termed a corner reflector. It will thus be seen that a series of corner reflectors 8 is formed by positioning of the members 5, 6, and 7 in the described fashion, each bulkhead forming a group of 8 corner reflectors converging at a common point. By enclosing the corner reflectors within the permeable shell 1, the surfaces are protected from air turbulence and may, therefore, be of lightweight, frangible construction, but still present smooth, uniform surfaces for reflection of the radar beams.

In operation, the tow target is attached to a tow line and reeling device not shown but such as that described in my co-pending application Serial No. 559,495, filed January 16, 1956, now U.S. Patent No. 2,932,907. Due to its lightweight, streamlined construction, the target is capable of being towed at distances of 2500 feet to 10,000 feet behind the towing aircraft; yet, it may be towed at speeds ranging up to 500 m.p.h. by the standard jet fighter or jet trainer aircraft, on account of the low drag resistance attained by its novel construction.

Tow targets of three to eight feet in length, and one to two feet in diameter, weighing two to ten pounds respectively, have been found to operate most satisfactorily.

As the plane approaches the target run, the tow target may be unreeled to the desired trailing distance. The radar of the attacking aircraft can more accurately search and home on the target due to the triple reflection of its beam off the corner reflecting surfaces, for the beam will always be reflected in the same angular direction from which it came as shown in FIG. 4.

By forming a series of corner radar reflecting surfaces throughout the length of the tow target, it is possible to reflect the beam off more than one corner reflector and to thus increase the intensity of the echoing beam on the radar screen.

Since each bulkhead forms a group of 8 corner reflectors, each reflector an octant about a common point, a radar beam striking the target will always be directly reflected regardless of the angle of attack of the aircraft. The smallness of the target will thus be compensated for by the full reflection from its surfaces so as to further increase the intensity of the echoing beam.

As mentioned earlier, enclosing the surface members inside a shell makes it possible to maintain each of the surface segments of a corner reflector mutually perpendicular to each other since any deflection or billowing due to the turbulence in the air stream is substantially eliminated.

To summarize the construction and advantages of the preferred form of this invention, there is provided a low-drag, frangible, lightweight high speed target with internal corner reflectors arranged in series so as to attain maximum radar reflectivity. Obviously many changes within the scope of the following claims may be resorted to. The above detailed description is not to be construed as limiting the invention to the precise construction described and shown.

What is claimed is:

1. A frangible radar reflecting tow target adapted to be towed by high speed jet propelled aircraft comprising a thin shell of streamline contour, said shell being made of frangible material and permeable to radar beams and a plurality of frangible corner reflectors arranged so as to reflect incident radar beams throughout a hemisphere enclosing the target, said reflectors being positioned within said shell and said shell and said reflectors disposed to mutually support and reinforce one another.

2. A radar reflective, streamlined tow target adaptable for towing by high speed aircraft consisting of a streamlined shell of frangible composition and permeable to radar beams having rearwardly disposed stabilizer surfaces and means for attachment to a towline, and an internal frame for supporting said shell constituting a plurality of mutually intersecting, perpendicular surfaces having a covering of radar reflective material to define a series of enclosed corner reflectors extending throughout the length of said shell for the reflection of radar beams traversing said tow target.

3. A radar reflective, streamlined tow target adaptable for towing by high speed aircraft consisting of a thin, streamlined shell of frangible composition and permeable to radar beams including means for attachment to a towline and rearwardly disposed stabilizer surfaces, an internal frame of frangible composition for supporting said shell having a vertical wall extending the length of said shell, a plurality of horizontal members disposed perpendicular to said vertical wall together with a plurality of transverse bulkhead members arranged at spaced axial intervals perpendicular to the planes of said horizontal members and said vertical wall member so as to define mutually perpendicular intersecting surfaces, said mutually perpendicular intersecting surfaces having a covering of radar reflective material so as to provide for a series of internal corner reflectors for reflection of radar beams traversing said tow target.

4. An aerial tow target, comprising: a hollow, streamlined, elongate body member having a low drag aerodynamic configuration, said body member being formed of a thin walled body shell, the tenuous walls of which are formed of a nonmetallic material having a low resistance to penetration by objects making impact therewith; a plurality of sheets of metallic foil; support means formed of a low density, nonmetallic material having a relatively high volume weight ratio for mounting the plurality of said sheets in at least three normally intersecting planes, said body shell being mounted about said support means; means bonding the internal contacting surfaces of said body shell to said support means, whereby the latter internally reinforces the body member; and means carried by said body shell for attaching the body member to a towline for tow by a towing aircraft.

References Cited in the file of this patent

UNITED STATES PATENTS

| | | |
|---|---|---|
| 1,317,958 | Clark | Oct. 7, 1919 |
| 2,419,549 | Griesinger | Apr. 29, 1947 |
| 2,463,517 | Chromak | Mar. 8, 1949 |
| 2,620,189 | Livermon | Dec. 2, 1952 |
| 2,667,351 | McKinney | Jan. 26, 1954 |
| 2,706,357 | Nigh | Apr. 19, 1955 |